US010572873B2

(12) United States Patent
Tanner et al.

(10) Patent No.: US 10,572,873 B2
(45) Date of Patent: Feb. 25, 2020

(54) METHOD AND SYSTEM FOR THE TRANSMISSION OF AUTHENTICATED AUTHORIZATION REQUESTS (71) Applicant: MasterCard International Incorporated, Purchase, NY (US)

(72) Inventors: Colin Tanner, Uxbridge (GB); David Anthony Roberts, Appleton (GB); Susan Thompson, Burland (GB); Clive Leader, Syston (GB)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 1979 days.

(21) Appl. No.: 13/769,059

(22) Filed: Feb. 15, 2013

(65) Prior Publication Data
US 2014/0236821 A1 Aug. 21, 2014

(51) Int. Cl.
G06Q 20/38 (2012.01)
G06Q 20/34 (2012.01)
G06Q 20/40 (2012.01)
G06Q 20/32 (2012.01)

(52) U.S. Cl.
CPC ........... G06Q 20/40 (2013.01); G06Q 20/322 (2013.01); G06Q 20/3563 (2013.01); G06Q 20/3825 (2013.01); G06Q 20/3827 (2013.01); G06Q 20/3829 (2013.01); G06Q 20/38215 (2013.01)

(58) Field of Classification Search
CPC ............. G06Q 20/3829; G06Q 20/322; G06Q 20/341; G06Q 20/02; G06Q 20/3821; G06Q 20/3825; G06Q 20/3227; G06Q 20/40; H04L 2209/56; H04L 9/3263
See application file for complete search history.

(56) References Cited

U.S. PATENT DOCUMENTS

| 2003/0140011 A1* | 7/2003 | Ishimi ................ G06Q 10/087 705/76 |
| 2005/0119978 A1* | 6/2005 | Ates ........................ G06Q 20/04 705/67 |
| 2011/0238579 A1* | 9/2011 | Coppinger ............ G06Q 20/20 705/67 |

OTHER PUBLICATIONS

Bruce Schneier, Applied Cryptograpy, 1996, John Wiley and Sons, Inc., Second Edition, 32-44.*

* cited by examiner

Primary Examiner — Scott S Trotter
(74) Attorney, Agent, or Firm — Buchanan Ingersoll & Rooney PC (57) ABSTRACT A method for verifying the source of an authorization request includes: storing an integrated circuit card (ICC) master key; receiving an authorization request for a transaction, wherein the request includes an ICC dynamic number, and the ICC dynamic number is extracted from signed data, based on the ICC master key, generated by a payment card during combined data authentication (CDA); verifying the authenticity of the ICC dynamic number using the stored ICC master key; and transmitting the authorization request to a third party. A method for transmitting an authentic authorization request includes: storing payment card data, the data including an ICC master key associated with the payment card; authenticating the card data using CDA to generate signed data; extracting, from the signed data, an ICC dynamic number based on the ICC master key; and transmitting an authorization request for a transaction, the request including the extracted ICC dynamic number.

20 Claims, 8 Drawing Sheets

METHOD AND SYSTEM FOR THE TRANSMISSION OF AUTHENTICATED AUTHORIZATION REQUESTS

FIELD

The present disclosure relates to the transmission of authorization requests and the authentication of the same, specifically the use of an integrated circuit card dynamic number to authenticate the authorization request prior to the request arriving at the payment processor.

BACKGROUND

In many payment processing scenarios for payment card transactions, authorization requests are routed from the initial merchant point-of-sale and then, sometimes via an acquirer, on to a payment processor. The payment processor, in communication with an issuer of the payment card, will process the transaction and return a response to the merchant and/or acquirer. In some traditional systems, the point-of-sale terminal would authenticate the payment card prior to the submitting of the authorization request to the payment processor. However, in some systems, particularly transactions taking place through the Internet, the payment card may not be authenticated prior to the submission of the authorization request. In such an instance, the payment processor may be at risk to receive attacks, attempts at fraud, or a large number of improper transactions due to the non-authentication of the payment card purported to be involved in the authorization request.

Some methods that have been designed to protect the payment processor in such a situation include wrapping the authorization request using an encryption wrapper. However, such wrapping can be cumbersome to the payment processor, and to other parties involved in the transaction. Such methods often require additional steps to be performed as part of the processing, and furthermore may be unable to be performed using existing systems. Accordingly, there is a need for a technical solution to authenticate a payment card in a payment card transactions that does not require modification of legacy payment systems.

SUMMARY

The present disclosure provides a description of a systems and methods for the transmission of and verification of the source of authorization requests for payment card transactions.

A method for verifying the source of an authorization request includes: storing, in a database, an integrated circuit card (ICC) master key; receiving, by a receiving device, an authorization request for a transaction, wherein the authorization request includes at least an ICC dynamic number, the ICC dynamic number is extracted from the signed data generated by a payment card during combined data authentication (CDA), and the signed data is based on the ICC master key; verifying the authenticity of the ICC dynamic number using the stored ICC master key; and transmitting, by a transmitting device, the authorization request to a third party.

A method for transmitting an authentic authorization request includes: storing, in a secure element, data related to a payment card, wherein the data includes at least an integrated circuit card (ICC) master key associated with the payment card; authenticating, by a processing device, the data related to the payment card using combined data authentication (CDA) to generate signed data; extracting, from the generated signed data, an ICC dynamic number based on the ICC master key; and transmitting, by a transmitting device, an authorization request for a transaction, wherein the authorization request includes at least the extracted ICC dynamic number for verification of the source of the authorization request.

A system for verifying the source of an authorization request includes a database, a receiving device, a processing device, and a transmitting device. The database is configured to store an integrated circuit card (ICC) master key. The receiving device is configured to receive an authorization request for a transaction, wherein the authorization request includes at least an ICC dynamic number, the ICC dynamic number is extracted from the signed data generated by a payment card during combined data authentication (CDA), and the signed data is based on the ICC master key. The processing device is configured to verify the authenticity of the ICC dynamic number using the stored ICC master key. The transmitting device is configured to transmit the authorization request to a third party.

A system for transmitting an authentic authorization request includes a secure element, a processing device, an extracting device, and a transmitting device. The secure element is configured to store data related to a payment card, wherein the data includes at least an integrated circuit card (ICC) master key associated with the payment card. The processing device is configured to authenticate the data related to the payment card using combined data authentication (CDA) to generate signed data. The extracting device is configured to extract, from the generated signed data, an ICC dynamic number based on the ICC master key. The transmitting device is configured to transmit an authorization request for a transaction, wherein the authorization request includes at least the extracted ICC dynamic number for verification of the source of the authorization request.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Definition of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, etc.

Payment Account—A financial account that may be used to fund a transaction, such as a checking account, savings account, credit account, virtual payment account, etc. A payment account may be associated with an entity, which may include a person, family, company, corporation, governmental entity, etc. In some instances, a payment account may be virtual, such as those accounts operated by PayPal®, etc.

Payment Card—A card or data associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated payment account. In some instances, a check may be considered a payment card where applicable.

System for Distributing Offers and Profiles Based on Redemption History

Figure 1:
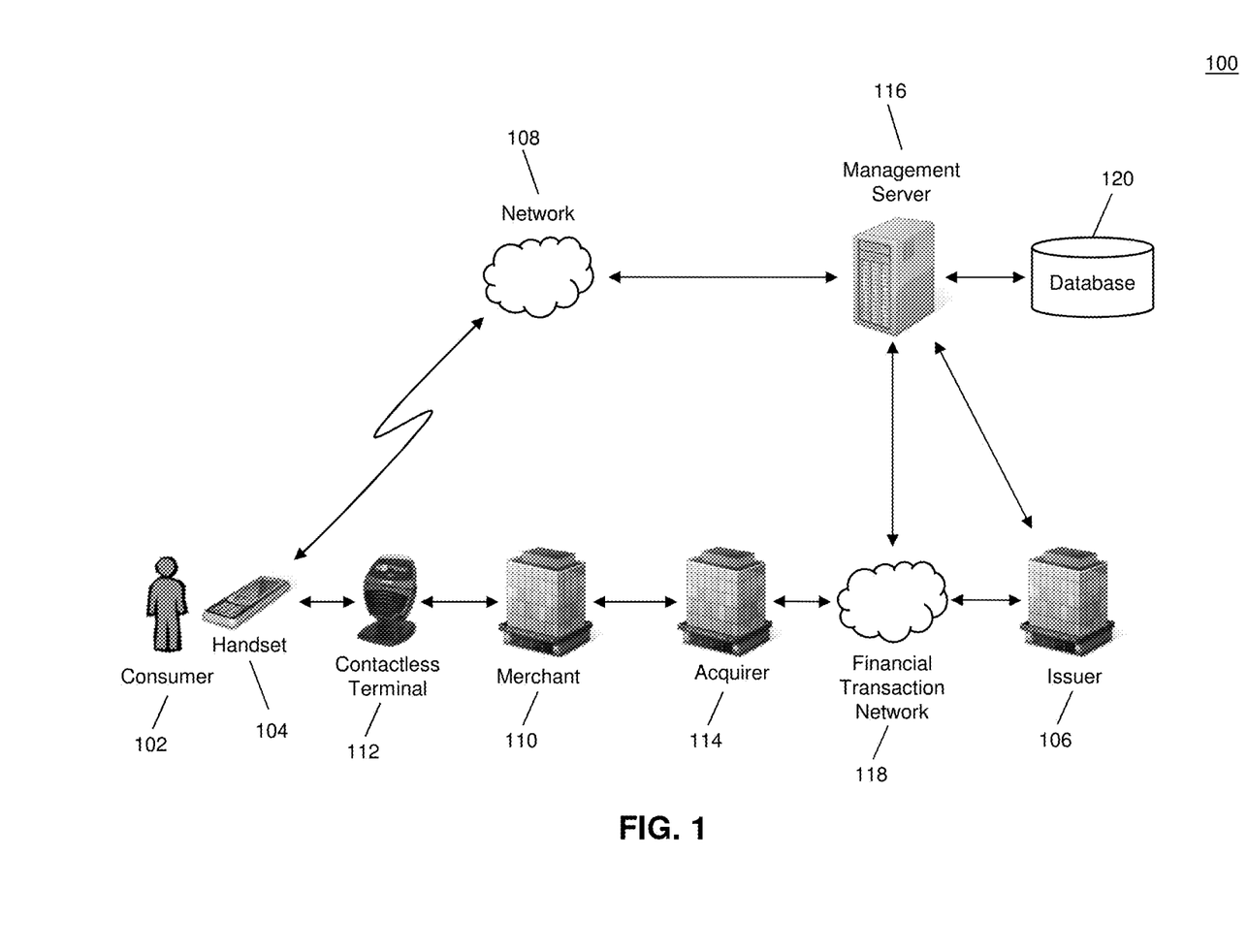
FIG. 1 is a high level architecture illustrating a system for transmitting and authenticating authorization requests in accordance with exemplary embodiments.

FIG. 1 is a high level architecture illustrating a system 100 for verifying the source of an authorization request and transmitting an authentic authorization request.

The system 100 may include a consumer 102. The consumer 102 may possess a handset 104. The handset 104 may be a mobile communication device configured to store payment information for at least one payment card issued to the consumer 102 by an issuer 106, such as an issuing bank. The handset 104 may be a cellular phone, smart phone, tablet computer, laptop computer, or any other type of mobile communication device suitable for performing the functions disclosed herein as will be apparent to persons having skill in the relevant art. In some embodiments, the handset 104 may not be mobile and may instead be a stationary communication device, such as a desktop computer. In an exemplary embodiment, the handset 104 includes a secure data storage (e.g., a Secure Element) configured to store payment details for a payment card. Methods for storing payment details for a payment card in secure data storage of a mobile communication device will be apparent to persons having skill in the relevant art.

In traditional payment processing methods using a mobile communication device, the consumer 102 may visit a merchant 110, which may include a contactless terminal 112 as part of the point-of-sale. The contactless terminal 112 may be a terminal configured to receive funding account details for a financial transaction from a mobile communication device (e.g., the handset 104) using near field communication (NFC), though other forms of communication, whether wireless, optical, sound, etc., at the physical layer are alternatives. Methods for the transmission and receipt of payment details using NFC will be apparent to persons having skill in the relevant art. The handset 104 may transmit payment details stored therein to the contactless terminal 112 via NFC for the funding of the financial transaction.

The contactless terminal 112 may authenticate the payment card used in the financial transaction and transmit the payment details and other transaction information (e.g., transaction amount, etc.) from the merchant 110 to an acquirer 114 (e.g., an acquiring bank). The acquirer may submit an authorization request for the financial transaction to a financial transaction network 118. The financial transaction network 118 may be a payment network configured to process financial transactions. The financial transaction network 118 may transmit the payment details included in the authorization request to the issuer 106, which may verify the payment account corresponding to the payment card involved in the financial transaction, and then may notify the financial transaction network 118 of approval or denial of the transaction based on the payment account. The financial transaction network 118 may then submit an authorization response to the acquirer 114, which may forward the response to the merchant 110 for finalizing of the transaction.

In an exemplary embodiment, the handset 104 may store the payment details for the payment card in secure data storage as well as an integrated circuit card (ICC) master key associated with the payment card. In some instances, the ICC master key may be transmitted to the handset 104 from the issuer 106, as discussed in more detail below. The handset 104 may generate signed data based on the payment details and the ICC master key, as discussed below, and may extract an ICC dynamic number from the generated signed data. The handset 104 may then transmit the ICC dynamic number to a management server 116, via a network 108, as part of an authorization request for the financial transaction.

The management server 116 may be a processing server configured to verify the source and/or authenticity of an authorization request. Suitable types and configurations of the management server 116 will be apparent to persons having skill in the relevant art and may include the computer system 700 of FIG. 7, discussed in more detail below. The management server 116 may store, in a database 120, the ICC master key associated with the payment card involved in the financial transaction (e.g., provided by the issuer 106), along of course with many others in a practical application. The management server 116 may verify the authenticity of the ICC dynamic number included in the authorization request using the stored ICC master key. Upon authenticating the ICC dynamic number, the management server 116 may route the authorization request to the financial transaction network 118 for processing, as discussed above using traditional payment card transaction processing.

In such an embodiment, the financial transaction network 118 may receive an authorization request where the payment information included in the request has been previously authenticated. This may be beneficial in instances where the contactless terminal 112 or merchant point-of-sale may not be configured to authenticate payment details for the payment card used in the financial transaction. For example, the handset 104 (e.g., or the contactless terminal 112 or the merchant point-of-sale) may submit the authorization request to the management server 116 in an Internet transaction (e.g., where the network 108 is the Internet), which may forward the authorization request to the financial transaction network 118 after the authorization request is authenticated. In such an example, the financial transaction network 118 would be at a reduced risk for attacks and excess traffic due to unverified authorization requests.

Handset

Figure 2:
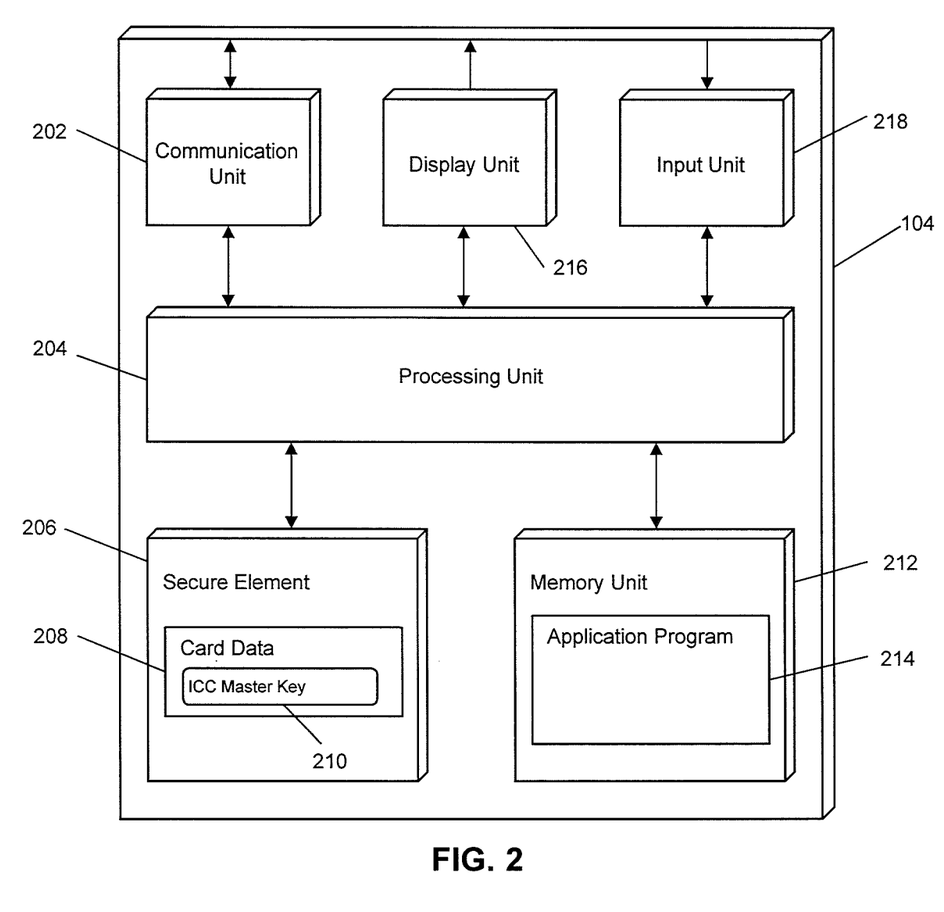
FIG. 2 is a diagram illustrating a mobile device for use in the system of FIG. 1 in accordance with exemplary embodiments.

FIG. 2 illustrates an embodiment of the handset 104 of the system 100. It will be apparent to persons having skill in the relevant art that the embodiment of the handset 104 illustrated in FIG. 2 is provided as illustration only and may not be exhaustive to all possible configurations of the handset 104 suitable for performing the functions as discussed herein. For example, the computer system 700 illustrated in FIG. 7 and discussed in more detail below may be a suitable configuration of the handset 104. Here, the term handset should be interpreted to include mobile telephones, PDA, tablet computers, laptops or nearly any computing device that can be used in a transaction at a POS.

The handset 104 may include a communication unit 202. The communication unit 202 may be configured to transmit and/or receive data between the handset 104 and the network 108. In some embodiments, the communication unit 202 may include a communication infrastructure or interface and one or more antennas. In one embodiment, the communication unit 202 may include a port, such as for connecting a cable or wire (e.g., an Ethernet cable) to the handset 104. In some embodiments, the communication unit 202 may be configured to receive data related to a payment card.

The handset 104 may further include a processing unit 204 and a Secure Element 206. It will be apparent to persons having skill in the relevant art that the Secure Element 206 is provided as illustration only and that the handset 104 may include any type of secure data storage suitable for performing the functions as disclosed herein. The processing unit 204 may be configured to store the data related to the payment card received by the communication unit 202 as card data 208 in the Secure Element 206. Methods for storing data in a Secure Element in a mobile communication device will be apparent to persons having skill in the relevant art.

The card data 208 may be data related to a payment card issued to the consumer 102 by the issuer 106. The card data 208 may include any relevant data for use in funding a financial transaction, such as a payment card number, expiration date, security code, cardholder (e.g., consumer 102) name, etc. The card data 208 may also include an ICC master key 210. The ICC master key 210 may be included in the card data 208 and may be associated with the payment card such that each payment card may include a unique corresponding ICC master key 210. In an exemplary embodiment, the management server 116 may include an ICC master key corresponding to the ICC master key 210 for verifying the authenticity of an authorization request originating at the handset 104, as discussed in more detail below.

The handset 104 may further include a memory unit 212. The memory unit 212 may be any type of memory suitable for the storage of data in the handset 104 as will be apparent to persons having skill in the relevant art, such as a hard disk drive, flash drive, solid state drive, Secure Digital card, etc. The memory unit 212 may include an application program 214. The application program 214 may include program code for a program to be executed by the processing unit 204, such as an electronic wallet program. The display unit 216 may be configured to display data, graphics, images, multimedia and other forms of information to the consumer 102. For example, the display unit 216 may display output of the application program 214 as executed by the processing unit 204. The display unit 216 may be any type of display suitable for performing the functions as disclosed herein as will be apparent to persons having skill in the relevant art, such as a liquid crystal display (LCD), light-emitting diode (LED) display, capacitive touch display, etc.

The handset 104 may further include an input unit 218. The input unit 218 may be configured to receive input from the consumer 102, which may be identified and processed by the processing unit 204. The input unit 218 may be any type of input unit suitable for performing the functions as disclosed herein as will be apparent to persons having skill in the relevant art, such as a keyboard, mouse, click wheel, trackball, camera, microphone, touch display, etc. In one embodiment, the application program 214 may be an electronic wallet program configured to display (e.g., via the display unit 216) at least one payment card to the consumer 102 for selection (e.g., via the input unit 218) and use in a financial transaction. Electronic wallet programs or other programs that may be suitable for use as the application program 214 will be apparent to persons having skill in the relevant art.

The handset 104 may be configured to generate an ICC dynamic number and submit an authorization request to the management server 116 for the processing of a financial transaction. The processing unit 204 may be configured to perform combined data authentication (CDA) on the card data 208 using the associated ICC master key 210 to generate signed data (e.g., data signed by the ICC master key 210). The signed data generated by performing CDA may be used to authenticate the payment details to assure the validity of the payment information submitted in the authorization request. Information included in the signed data generated by the performance of CDA will be apparent to persons having skill in the relevant art. In the present embodiment, the generated signed data may include at least an ICC dynamic number. The ICC dynamic number may be produced by a one-off session key derived from the ICC master key 210, as will be apparent to persons having skill in the relevant art.

The processing unit 210 may be configured to extract the ICC dynamic number from the generated signed data and include the ICC dynamic number in an authorization request. The communication unit 202 may transmit the authorization request to the management server 116 via the network 108, which may authenticate the authorization request (e.g., the payment information included in the authorization request) using the included ICC dynamic number. In such an embodiment, the financial transaction network 118 may process a financial transaction using an authorization request including payment information that has been verified, without the need for the merchant 110 or acquirer 114 to modify existing point-of-sale systems.

It will be apparent to persons having skill in the relevant art that, in some embodiments, the communication unit 202 may be configured to transmit the extracted ICC dynamic number to the merchant 110. In such an embodiment, the merchant point-of-sale (e.g., the contactless terminal 112) may be configured to submit an authorization request to the management server 116 including the ICC dynamic number. In such an embodiment, the merchant 110 may not be required to modify existing systems to submit an authorization request where the payment card used in the transaction has been verified.

Management Server

Figure 3:
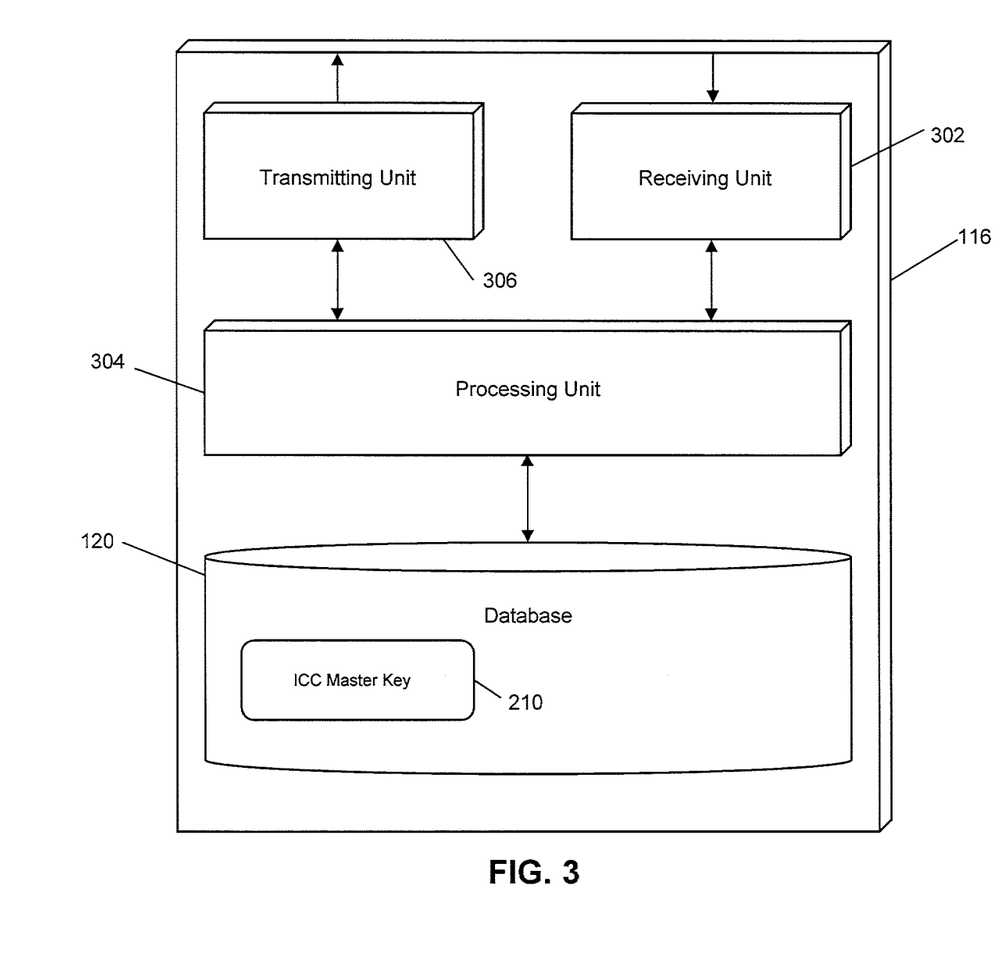
FIG. 3 is a diagram illustrating a management server for use in the system of FIG. 1 in accordance with exemplary embodiments.

FIG. 3 illustrates an embodiment of the management server 116 of the system 100. It will be apparent to persons having skill in the relevant art that the embodiment of the management server 116 illustrated in FIG. 2 is provided as illustration only and may not be exhaustive to all possible configurations of the management server 116 suitable for performing the functions as discussed herein. For example, the computer system 700 illustrated in FIG. 7 and discussed in more detail below may be a suitable configuration of the management server 116.

The management server 116 may include a receiving unit 302. The receiving unit 302 may be configured to receive a plurality of ICC master keys 210, such as from the issuer 106. Each of the ICC master keys 210 may be associated with a payment card, such as a payment card issued to the consumer 102 with corresponding card data stored in the handset 104. The management server 116 may include a processing unit 306, which may store the received plurality of ICC master keys 210 in the database 120.

The receiving unit 302 may be further configured to receive an authorization request for a transaction, such as a financial transaction or management transaction. In one embodiment, the request may be for a financial transaction received via the network 108, such as from the handset 104 or the merchant 110 and/or acquirer 114. In another embodiment, the request may be for a management transaction received from the issuer 106 or the handset 104 (e.g., for modification of payment account or payment card details by the consumer 102 and/or the issuer 106).

The authorization request may include at least a payment card and an ICC dynamic number, which may have been extracted from signed data generated by a payment card during CDA, such as by the handset 104 as discussed above. The processing unit 304 may be configured to verify the authenticity of the ICC dynamic number included in the authorization request using the ICC master key 210 stored in the database 120 associated with the payment card involved in the transaction. If the ICC dynamic number, and therefore the authorization request, is authentic, then a transmitting unit 306 may transmit the authenticated authorization request to a third party, such as the financial transaction network 118 (e.g., for a financial transaction) or the issuer 106 (e.g., for a management transaction).

If the ICC dynamic number is not authentic, then the management server 116 may notify the source of the authorization request and/or the intended recipient of the authorization request of the inauthenticity of the ICC dynamic number. In such an instance, the intended recipient, such as the financial transaction network 118, may be insulated from unverified authorization requests and attempts at fraud by virtue of the verification performed by the management server 116.

Data Transmission

Figure 4:
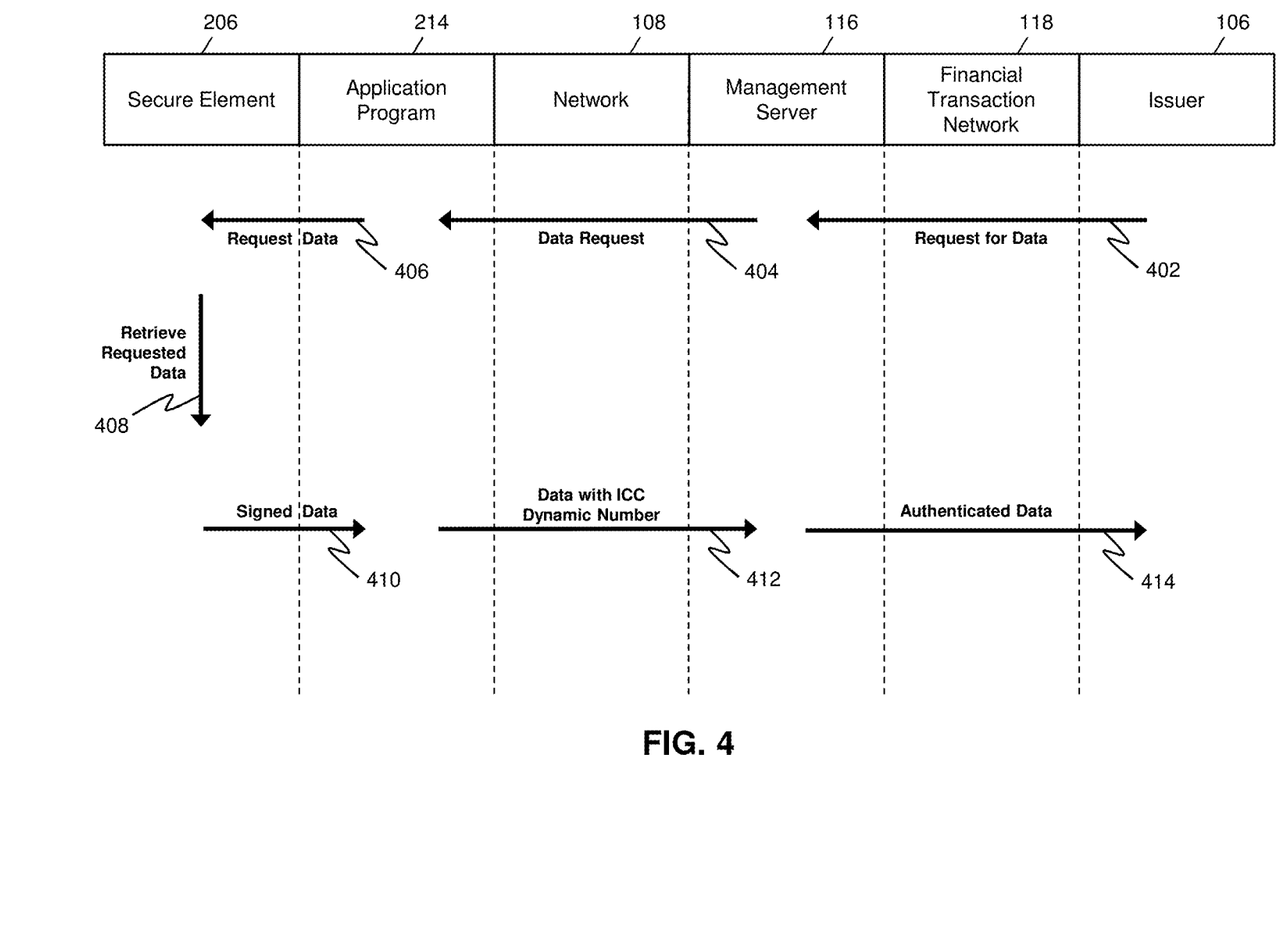
FIG. 4 is a flow diagram illustrating a data transmission method of the system of FIG. 1 in accordance with exemplary embodiments.

FIG. 4 is a flow diagram illustrating the transmission of data in the system 100 of FIG. 1 between the issuer 106, and/or the management server 116, and the handset 104 using the management system 116.

At step 402, the issuer 106 may transmit a request for data to the management server 116. In some embodiments, the request for data may be transmitted to the issuer 106 via the network 108. The request for data may be any type of request, and may include any data and be in any suitable format that may depend on the scenario and circumstances of the request for data. For example, the request for data may be a management request, which may include a request to modify card details (e.g., the card data 208 stored in the handset 104) or a request for data included in the card data 208. In step 404, the management server 116 may transmit a data request to the handset 104 via the network 108 based on the request for data by the issuer 106. For example, the management server 116 may convert the request for data into a suitable formatted data request prior to transmission to the handset 104.

In step 406, the application program 214 of the handset may request relevant data based on the data request from the Secure Element 206 (e.g., or other secure data storage). The Secure Element 206 may retrieve the requested data in step 408 (e.g., from the card data 208), which may be signed using the ICC master key 210 in order to prove authenticity of the source of the data. In step 410, the Secure Element 206 may make the signed data available to the application program 214. The handset 104 may then, in step 412, extract the ICC dynamic number from the signed data and transmit (e.g., via the communication unit 202) the requested data with the ICC dynamic number to the management server 116 via the network 108. The management server 116 may then verify the authenticity of the data using the ICC dynamic number, as discussed above, and forward the authenticated data to the issuer 106 in step 414.

It will be apparent to persons having skill in the relevant art that, in some embodiments, steps 402 and 414 may be optional steps. In some instances, data may be transmitted between the management server 116 and the handset 104 by the request of the management server 116 and/or the handset 104 without involving the issuer 106. For example, an authorization request for a financial transaction involving the consumer 102 and/or the handset 104 may be based on data (e.g., the ICC master key 210) included in the Secure Element 206 and may be transmitted to the management server 116 and not forwarded on to the issuer 106.

The management server 116 may be in a better position to request and receive data from the handset 104 than the issuer 106. In the present embodiment, the management server 116 may communicate with the handset 104 and receive data without the issuer 106 being required to modify existing systems. In addition, as discussed herein, the management server 116 may authenticate or verify data received from the handset 104 if signed using the ICC master key 210, which may result in more secure, trustworthy communication with the handset 104 and the issuer 106, without the issuer 106 modifying existing systems.

Such authenticated (e.g., secure) data transmission may be suitable for management transactions between the issuer 106 and the consumer 102 via the handset 104. For example, the issuer 106 may confirm consumer 102 details or payment card details, or the consumer 102 may request modifications to the corresponding payment account, from the handset 104. The management server 116 may be used to transmit the data to and from the handset 104 and the issuer 106 and authenticate the data originating from the handset 104, such that the data transmitted to the issuer 106 is always verified.

Method for Transmitting and Verifying an Authorization Request

Figure 5:
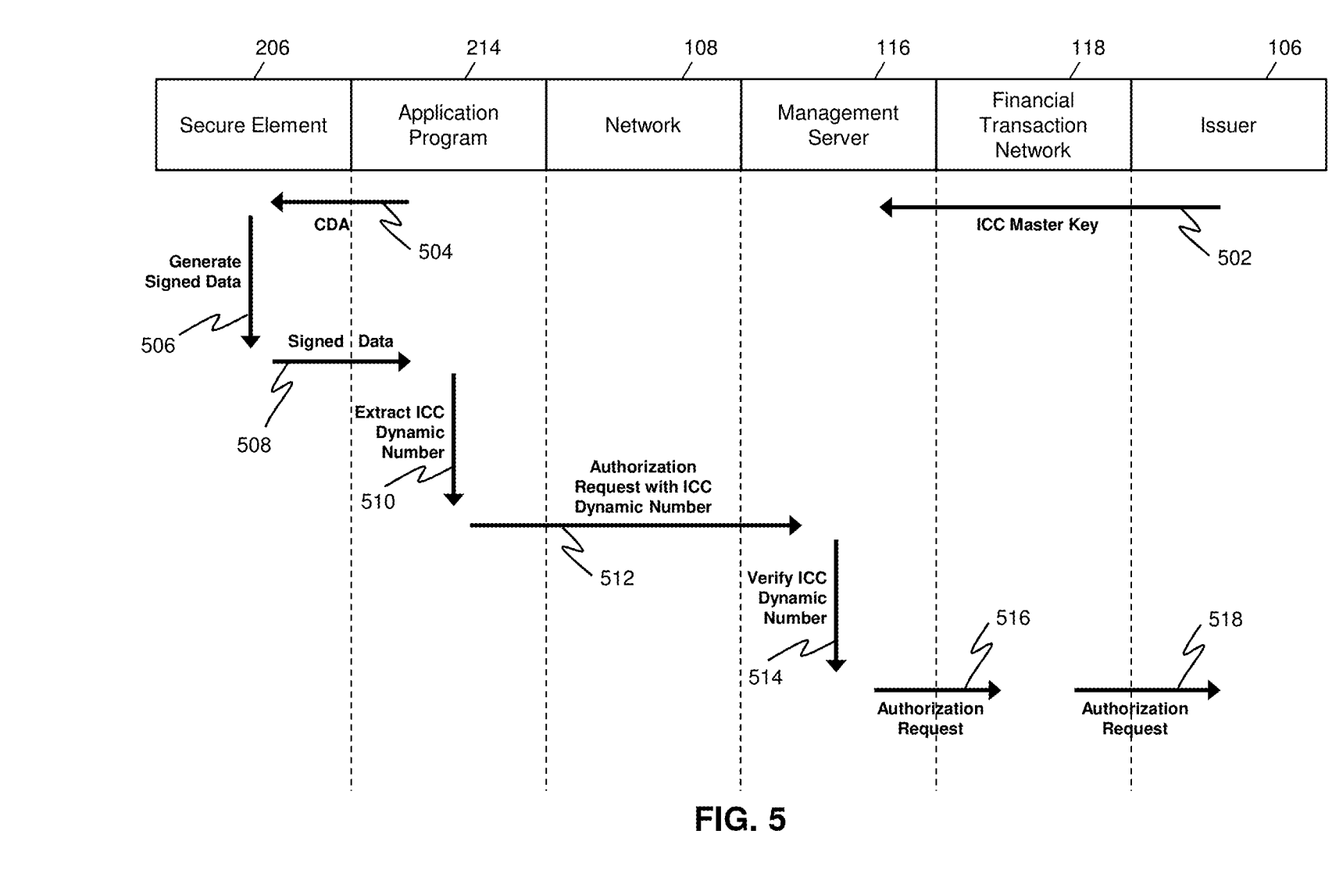
FIG. 5 is a flow diagram illustrating a method for transmitting and authenticating an authorization request in accordance with exemplary embodiments.

FIG. 5 is a flow diagram illustrating methods for transmitting and verifying the source of an authorization request.

In step 502, the issuer 106 may transmit an ICC master key, associated with a payment card issued by the issuer 106 to the consumer 102, to the management server 116 via a financial transaction network 118, although other networks might be used and/or the management server 116 may be co-located or part of the issuer 106. The management server 116 may store the ICC master key in the database 120, and may further include data related to the payment card and/or the consumer 102, such as for identification of the ICC master key. When the consumer 102 initiates a financial transaction with the merchant 110, the application program 214 of the handset (e.g., by the processing unit 204) may, in step 504, perform CDA on the card data 208 stored in the Secure Element 206. In step 506, data signed by the ICC master key 210 in the card data 208 may be generated as a result of the CDA processing.

In step 508, the generated signed data may be read (e.g., identified) by the application program 214. Then, in step 510, the application program 214 may extract an ICC dynamic number from the generated signed data. In step 512, the application program 214 may submit (e.g., via the communication unit 202) an authorization request including the ICC dynamic number to the management server 116 via the network 108. In one embodiment, the application program 214 may submit at least the ICC dynamic number to the merchant 110, who may submit the authorization request to the management server 116. The authorization request may include, in addition to the ICC dynamic number, any information necessary for the processing of the corresponding financial transaction. In some embodiments, the authorization request may be formatted pursuant to the International Organization for Standardization ISO 8583 standard.

In step 514, the management server 116 may verify the ICC dynamic number included in the authorization request using the ICC master key received and stored in the database 120 in step 402 and associated with the payment card involved in the financial transaction. The management server 116 may then, if the ICC dynamic number is verified, forward the authorization request to the financial transaction network 118 in step 516. The financial transaction network 118 may process the financial transaction, for which the payment information is previously verified. Processing the financial transaction may include transmitting, in step 518, at least a portion of the authorization request to the issuer 106. For example, the financial transaction network 118 may transmit the payment information and the transaction amount for the financial transaction to the issuer 106, such that the issuer 106 may respond with an indication if the transaction should be approved or denied based on the status of the corresponding payment account. The financial transaction network 118 may then submit an authorization response to the appropriate entity (e.g., the handset 104, the merchant 110, the management server 116, and/or the acquirer 114).

Exemplary Method for Verifying the Source of an Authorization Request

Figure 6:
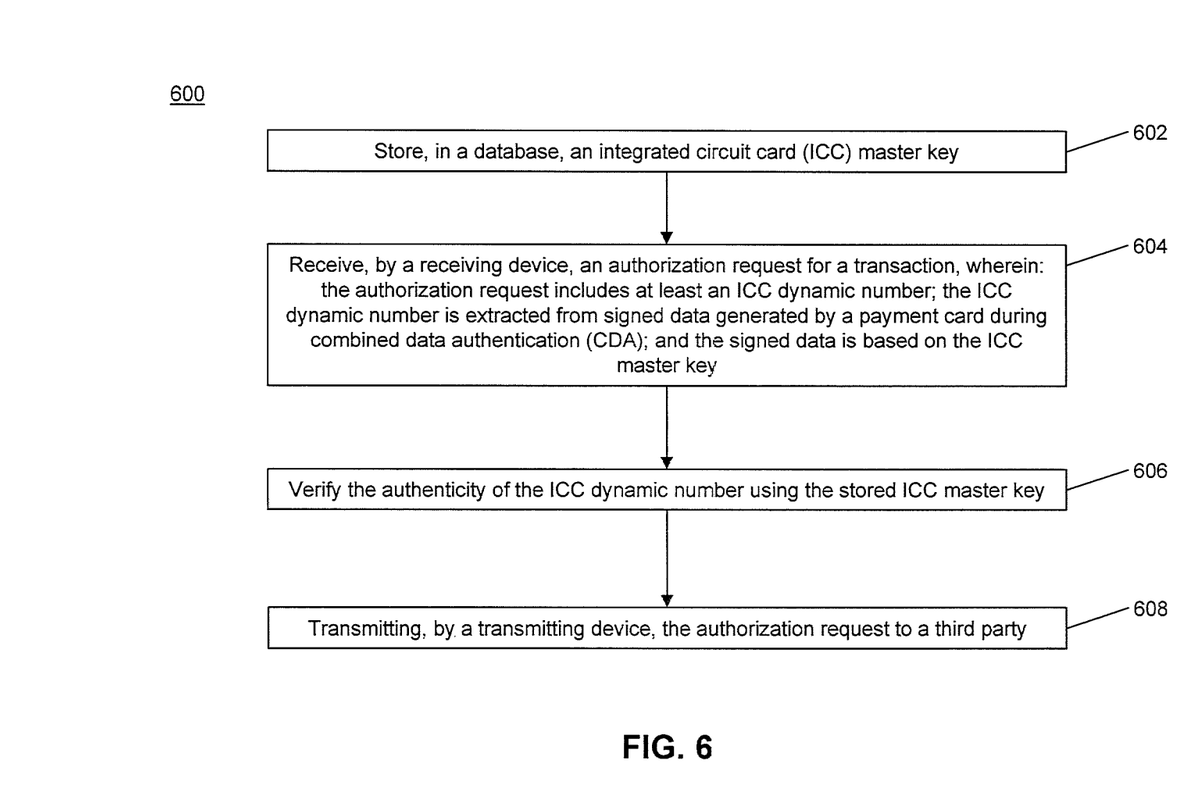
FIG. 6 is a flow chart illustrating an exemplary method for verifying the source of an authorization request in accordance with exemplary embodiments.

FIG. 6 illustrates an exemplary method 600 for verifying the source of an authorization request by the management server 116. The management server 116 may verify the source of an authorization request originating from the handset 104 (e.g., or by the merchant 110 and/or acquirer 114 including data originating from the handset 104) such that the financial transaction network 118 may not receive authorization requests that include unverified payment data.

In step 602, an integrated circuit card (ICC) master key may be stored in a database (e.g., the database 120). In step 604, a receiving device may receive an authorization request for a transaction, wherein: the authorization request includes at least an ICC dynamic number, the dynamic number is extracted from signed data generated by a payment card during combined data authentication (CDA), and the signed data is based on the ICC master key. In one embodiment, the authorization request may be received from an application program (e.g., the application program 214) executed by a mobile communication device (e.g., the handset 104). In a further embodiment, the handset 104 may include a Secure Element (e.g., the Secure Element 206) configured to store data (e.g., the card data 208) related to a payment card. In some embodiments, the transaction may be a management transaction.

In step 606, the authenticity of the ICC dynamic number may be verified using the stored ICC master key. In step 608, the authorization request may be transmitted, by a transmitting device, to a third party. In one embodiment, the third party may be a financial transaction network (e.g., the financial transaction network 118).

Exemplary Method for Transmitting an Authentic Authorization Request

Figure 7:
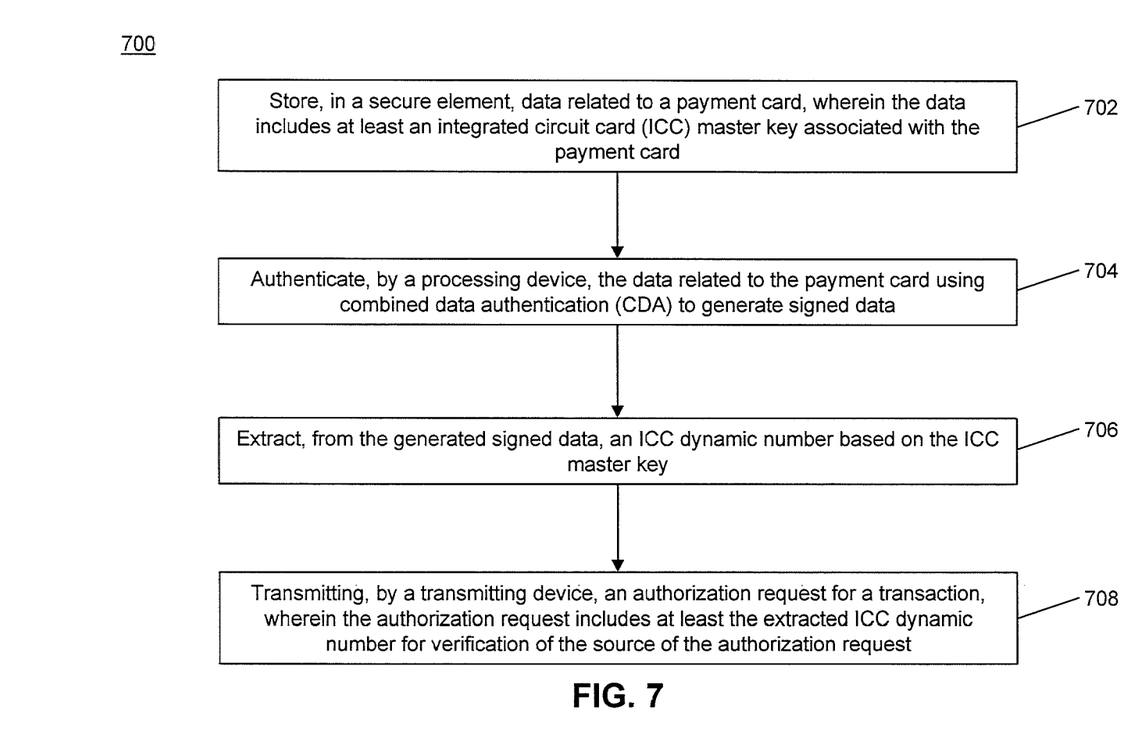
FIG. 7 is a flow chart illustrating an exemplary method for transmitting an authentic authorization request in accordance with exemplary embodiments.

FIG. 7 illustrates an exemplary method 700 for transmitting an authentic authorization request by the handset 104. The handset 104 may transmit an authorization request that includes data such that the payment details in the authorization request may be verified prior to the forwarding of the authorization request for processing at a financial transaction network.

In step 702, data related to a payment card (e.g., the card data 208) may be stored in a Secure Element (e.g., the Secure Element 206), wherein the data 208 includes at least an integrated circuit card (ICC) master key (e.g., the ICC master key 210) associated with the payment card. In one embodiment, the Secure Element 206 may be one of: an embedded chip, a subscriber identity module (SIM), or a secure digital (SD) card.

In step 704, the data 208 related to the payment card may be authenticated, by a processing device (e.g., the processing unit 204), using combined data authentication (CDA) to generate signed data. In one embodiment, the signed data may be a certificate signed by an ICC private key. In a further embodiment, the ICC private key may be the ICC master key 210. In step 706, an ICC dynamic number based on the ICC master key 210 may be extracted from the generated signed data.

In step 708, an authorization request for a transaction may be transmitted, by a transmitting device (e.g., the communication unit 202), wherein the authorization request includes at least the extracted ICC dynamic number for verification of the source of the authorization request. In one embodiment, the transaction may be a management transaction. In some embodiments, the authorization request may be transmitted to a management service (e.g., the management server 116) for verification and transmission to a financial transaction network (e.g., the financial transaction network 118).

Computer System Architecture

Figure 8:
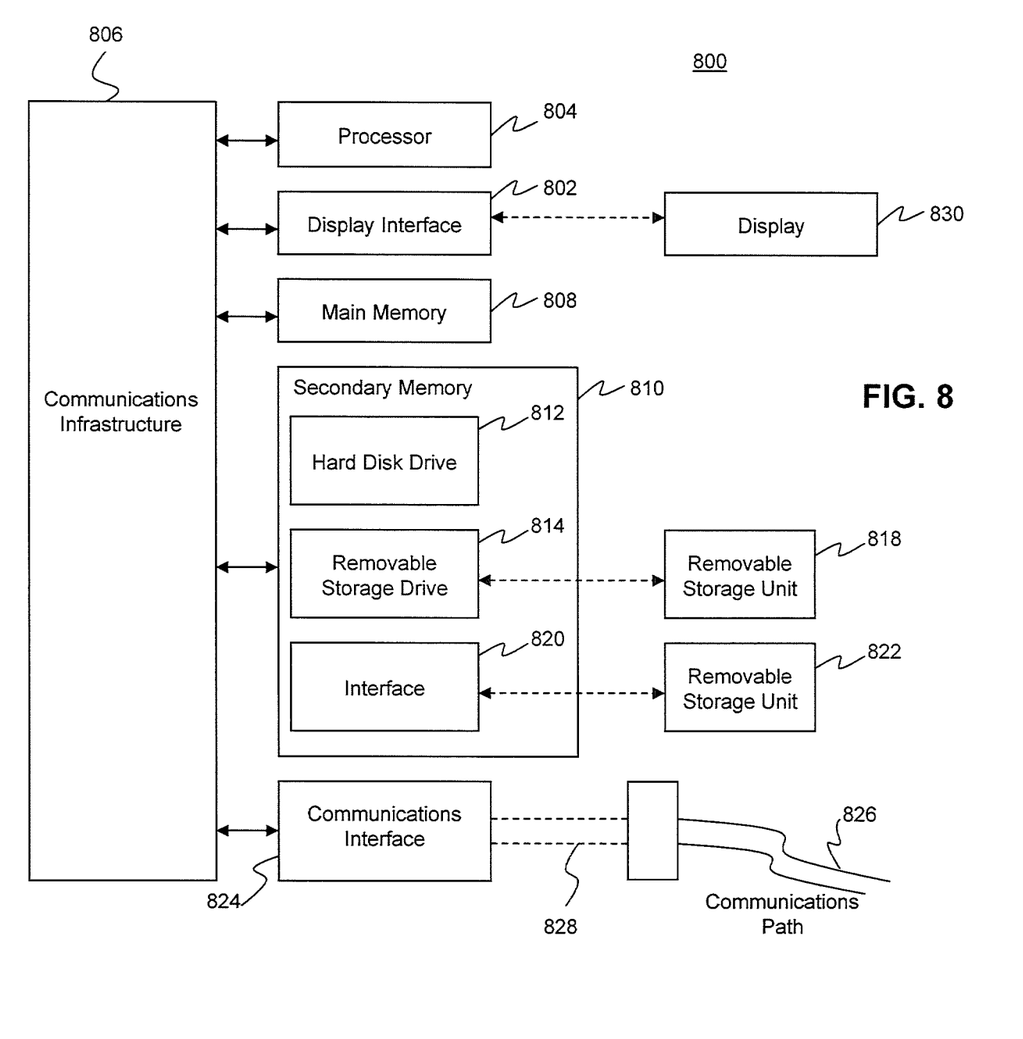
FIG. 8 is a block diagram illustrating a computer system architecture in accordance with exemplary embodiments.

FIG. 8 illustrates a computer system 800 in which embodiments of the present disclosure, or portions thereof, may be implemented as computer-readable code. For example, the handset 104, the contactless terminal 112, the merchant 110, the acquirer 114, the financial transaction network 118, the issuer 106, and the management server 116 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4-7.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device. The processor device 804 may be connected to a communication infrastructure 806, such as a bus, message queue, network (e.g., the network 108), multi-core message-passing scheme, etc. The network 108 may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 88. The secondary memory 88 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive, the removable storage unit 818 may be a floppy disk. In one embodiment, the removable storage unit 818 may be non-transitory computer readable recording media.

In some embodiments, the secondary memory 88 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

Computer program medium and computer usable medium may refer to memories, such as the main memory 808 and secondary memory 88, which may be memory semiconductors (e.g. DRAMs, etc.). These computer program products may be means for providing software to the computer system 800. Computer programs (e.g., computer control logic) may be stored in the main memory 808 and/or the secondary memory 88. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. FIGS. 4-7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

Techniques consistent with the present disclosure provide, among other features, systems and methods for the transmission and verifying of authentic authorization requests. While various exemplary embodiments of the disclosed systems and methods have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for verifying the source of an authorization request, comprising:
    receiving, at a server and from an issuer computer system, an integrated circuit card (ICC) master key;
    storing, in a database of the server, the integrated circuit card (ICC) master key;
    receiving, by a receiving device of the server and from a mobile device, an authorization request for a transaction, wherein
        the authorization request (i) is generated as part of a transaction conducted between the mobile device and a terminal and (ii) includes at least an ICC dynamic number,
        the ICC dynamic number (i) is produced by a one-off session key derived from the ICC master key, (ii) corresponds to data exchanged between the mobile device and the terminal during the transaction and, (iii) is extracted, by an application program executed by the mobile device, from signed data generated by a payment card during combined data authentication (CDA) occurring during the transaction between the mobile device and the terminal, and
        the signed data is based on the ICC master key;
    verifying, by a processing device of the server, the authenticity of the ICC dynamic number received from the mobile device using the stored ICC master key; and
    transmitting, by a transmitting device, the authorization request to a third party, when the authenticity of the ICC dynamic number is verified.

2. The method of claim 1, wherein the authorization request is received from an application program executed by a mobile communication device.

3. The method of claim 2, wherein the mobile communication device includes a secure element configured to store data related to the payment card.

4. The method of claim 1, wherein the third party is a financial transaction network.

5. The method of claim 1, wherein the transaction is a management transaction.

6. A method for transmitting an authentic authorization request, comprising:
    storing, in a secure element of a mobile device, data related to a payment card, wherein the data includes at least an integrated circuit card (ICC) master key associated with the payment card;
    exchanging, by the mobile device and with a point of sale terminal, data related to a transaction to be funded by the payment card;
    authenticating, by a processing device of a mobile device, the data related to the payment card using combined data authentication (CDA) to generate signed data;
    extracting, from the generated signed data and by the mobile device, an ICC dynamic number based on the ICC master key; and
    transmitting, by a transmitting device and to one of the point of sale terminal and a remote server, an authorization request for a transaction, wherein the authorization request includes at least the extracted ICC dynamic number for verification of the source of the authorization request.

7. The method of claim 6, wherein the signed data is a certificate signed by an ICC private key.

8. The method of claim 6, wherein the transaction is a management transaction.

9. The method of claim 6, wherein the authorization request is transmitted to a management service for verification and transmission to a financial transaction network.

10. The method of claim 6, wherein the secure element is one of: an embedded chip, a subscriber identity module (SIM), or a secure digital (SD) card.

11. A system for verifying the source of an authorization request, comprising:
    a database configured to store an integrated circuit card (ICC) master key;
    a receiving device configured to:
        receive, from an issuer computer system, an integrated circuit card (ICC master key);
        receive, from a mobile device, an authorization request for a transaction, wherein the authorization request:
            (i) is generated as part of a transaction conducted between the mobile device and a terminal, and
            (i) includes at least an ICC dynamic number,
        wherein the ICC dynamic number:
            (i) is produced by a one-off session key derived from the ICC master key,
            (ii) corresponds to data exchanged between the mobile device and the terminal during the transaction, and
            (iii) extracted, by an application program executed by the mobile device, from signed data generated by a payment card during combined data authentication (CDA) resulting from the transaction between the mobile device and the terminal, wherein the signed data is based on the ICC master key;
    a processing device configured to verify the authenticity of the ICC dynamic number received from the mobile device using the stored ICC master key; and
    a transmitting device configured to transmit the authorization request to a third party, when the authenticity of the ICC dynamic number is verified.

12. The system of claim 11, wherein the authorization request is received from an application program executed by a mobile communication device.

13. The system of claim 12, wherein the mobile communication device includes a secure element configured to store data related to the payment card.

14. The system of claim 11, wherein the third party is a financial transaction network.

15. The system of claim 11, wherein the transaction is a management transaction.

16. A mobile device for transmitting an authentic authorization request, comprising:
    a secure element configured to store data related to a payment card, wherein the data includes at least an integrated circuit card (ICC) master key associated with the payment card;
    a contactless communication interface configured to exchange data related to a transaction to be funded by the payment card with a point of sale terminal;
    a processing device configured to:
        authenticate the data related to the payment card using combined data authentication (CDA) to generate signed data;
        extract, from the generated signed data, an ICC dynamic number based on the ICC master key; and a transmitting device configured to transmit to one of the point of sale terminal and a remote server, an authorization request for a transaction, wherein the authorization request includes at least the extracted ICC dynamic number for verification of the source of the authorization request.

17. The device of claim 16, wherein the signed data is a certificate signed by an ICC private key.

18. The device of claim 16, wherein the transaction is a management transaction.

19. The device of claim 16, wherein the authorization request is transmitted to a management service for verification and transmission to a financial transaction network.

20. The device of claim 16, wherein the secure element is one of: an embedded chip, a subscriber identity module (SIM) or a secure digital (SD) card.

\* \* \* \* \*